(12) United States Patent
Panko

(10) Patent No.: US 7,726,224 B1
(45) Date of Patent: Jun. 1, 2010

(54) CROWN MOLDING CUTTING AID APPARATUS

(76) Inventor: Mark J. Panko, 3194 Brynwood Dr., Whitehall, PA (US) 18052

( * ) Notice: Subject to any disclaimer, the term of this patent is extended or adjusted under 35 U.S.C. 154(b) by 78 days.

(21) Appl. No.: 11/237,319

(22) Filed: Sep. 29, 2005

(51) Int. Cl.
 B26D 7/02 (2006.01)
(52) U.S. Cl. ............ 83/468.3; 83/468.7; 83/471.3; 83/477.1; 83/581; 269/303
(58) Field of Classification Search ............ 83/440, 83/468.3, 766, 581, 762, 821, 377, 375, 391, 83/395, 466.1, 471.3, 473, 490, 565, 829, 83/767, 765, 827; 144/371, 144.1, 145.1, 144/287, 51, 144.51; 33/568, 562, 455, 482, 33/1 SD, 23.11; 409/178; 269/41, 122, 229
See application file for complete search history.

(56) References Cited

U.S. PATENT DOCUMENTS

| 727,337 | A | * | 5/1903 | Forster ............... 144/253.2 |
| 752,406 | A | * | 2/1904 | Nichols .............. 83/766 |
| 1,063,113 | A | * | 5/1913 | Bremer ............... 83/760 |
| 2,872,955 | A | * | 2/1959 | Schmitz et al. ........ 83/468.3 |
| 2,894,543 | A | * | 7/1959 | Ivy, Jr .............. 83/435.14 |
| 3,483,901 | A | * | 12/1969 | Ray ................. 83/471.3 |
| 3,971,274 | A | * | 7/1976 | Barton .............. 83/100 |
| 4,693,156 | A | * | 9/1987 | Olvera .............. 83/422 |
| 4,875,399 | A | | 10/1989 | Scott et al. |
| 5,042,542 | A | * | 8/1991 | Purviance ........... 144/135.2 |
| D406,035 | S | * | 2/1999 | Erisoty et al. ........ D8/71 |
| D425,083 | S | | 5/2000 | Brickner, Jr. et al. |
| 6,076,575 | A | * | 6/2000 | Harkness ........... 144/144.1 |
| 6,305,449 | B1 | * | 10/2001 | Stover ............... 144/371 |
| 6,481,320 | B1 | | 11/2002 | McGrory et al. |
| 6,543,323 | B2 | | 4/2003 | Hayashizaki et al. |
| 6,588,468 | B1 | * | 7/2003 | Tucker et al. ........ 144/372 |
| 6,662,699 | B1 | * | 12/2003 | Schmidt ............. 83/765 |
| 6,668,695 | B2 | * | 12/2003 | Poole et al. ......... 83/466 |
| 6,679,305 | B2 | * | 1/2004 | Petersen ............. 144/253.1 |
| 6,694,851 | B2 | * | 2/2004 | Erisoty .............. 83/767 |
| 6,698,328 | B1 | * | 3/2004 | Schmidt ............. 83/766 |
| 6,758,123 | B2 | | 7/2004 | Svetlik et al. |
| 2003/0140745 | A1 | | 7/2003 | Lewis |
| 2003/0140759 | A1 | * | 7/2003 | Meredith et al. ...... 83/581 |

* cited by examiner

*Primary Examiner*—Boyer D. Ashley
*Assistant Examiner*—Laura M. Lee
(74) *Attorney, Agent, or Firm*—Charles A. Wilkinson; Clinton H. Wilkinson

(57) ABSTRACT

A crown molding cutting aid apparatus includes a panel that has a top side, a bottom side, a front edge, a back edge, a first side edge and a second side edge. The panel has a slot therein extending into the back edge. The back edge has a first notch and a second notch extending therein. The first and second notches are positioned on opposite sides of the slot. The notches are each angled away from the slot. The panel has a plurality of elongated apertures extending therethrough. Each of a plurality of fasteners is removably positionable through one of the apertures and into a table of a miter saw so that the panel is releasably secured to the table.

14 Claims, 2 Drawing Sheets

CROWN MOLDING CUTTING AID APPARATUS

BACKGROUND OF THE INVENTION

1. Field of the Invention

The present invention relates to cutting aid devices and more particularly pertains to a new cutting aid device for supporting a portion of crown molding while it is being cut by a miter saw.

2. Description of the Prior Art

The use of cutting aid devices is known in the prior art. U.S. Pat. No. 6,481,320 describes a device for holding a portion of crown molding as it is being cut. Another type of cutting aid device is U.S. Pat. No. 4,875,399 having a bracket which is removably attachable to a miter saw table and for holding a portion of crown molding at an angle while being cut. A vice assembly for holding an item to a miter saw table is found in U.S. Pat. No. 6,543,323. Still yet another such device is found in U.S. Pat. No. 6,758,123.

While these devices fulfill their respective, particular objectives and requirements, the need remains for a device that is removably attachable to a miter saw table and which is adapted for holding a large or small portion of crown molding in a stable manner and at a constant relative angle so that the crown molding may easily be cut along selectable angles.

SUMMARY OF THE INVENTION

The present invention meets the needs presented above by generally comprising a panel that has a top side, a bottom side, a front edge, a back edge, a first side edge and a second side edge. The panel has a slot therein extending into the back edge and toward the front edge. The slot is equally spaced from the first and second side edges. The back edge has a first notch and a second notch extending therein. The first and second notches are positioned on opposite sides of the slot. Each of the first and second notches has a first lateral edge, a second lateral edge and a rear edge positioned opposite of the back edge. Each of the first lateral edges is positioned adjacent to the slot. The first and second lateral edges are each angled away from the slot. The panel has a plurality of elongated apertures extending therethrough. Each of a plurality of fasteners is removably positionable through one of the apertures and into a table of a miter saw so that the panel is releasably secured to the table. The panel is secured to the table so that the back edge faces and is spaced from a back wall of the table. A portion of crown molding may be positioned on the table and abutted against the back edge so that the crown molding is stabilized on the table while being cut by the miter saw.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
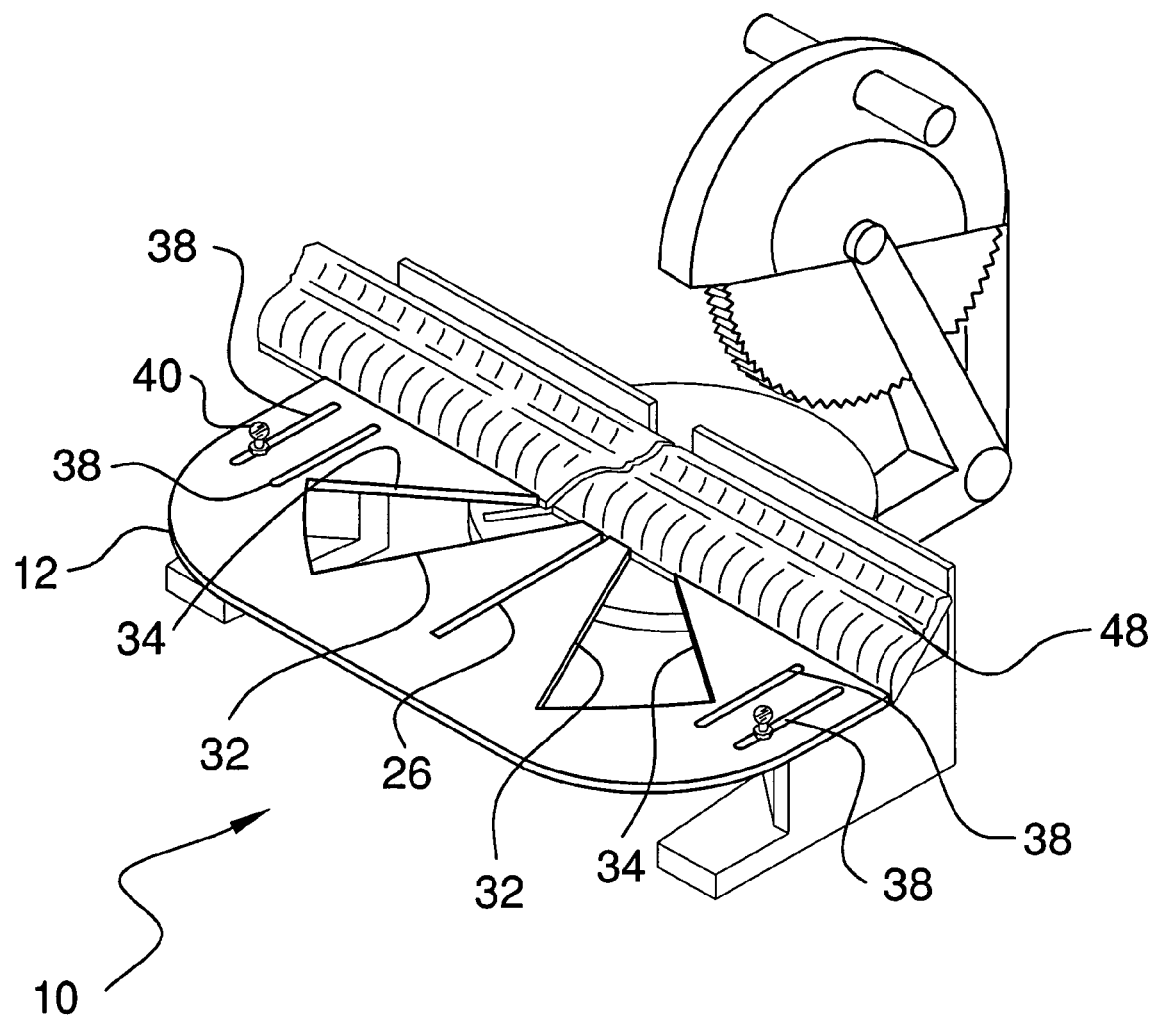
FIG. 1 is a perspective in-use view of a crown molding cutting aid apparatus according to the present invention.
Figure 2:
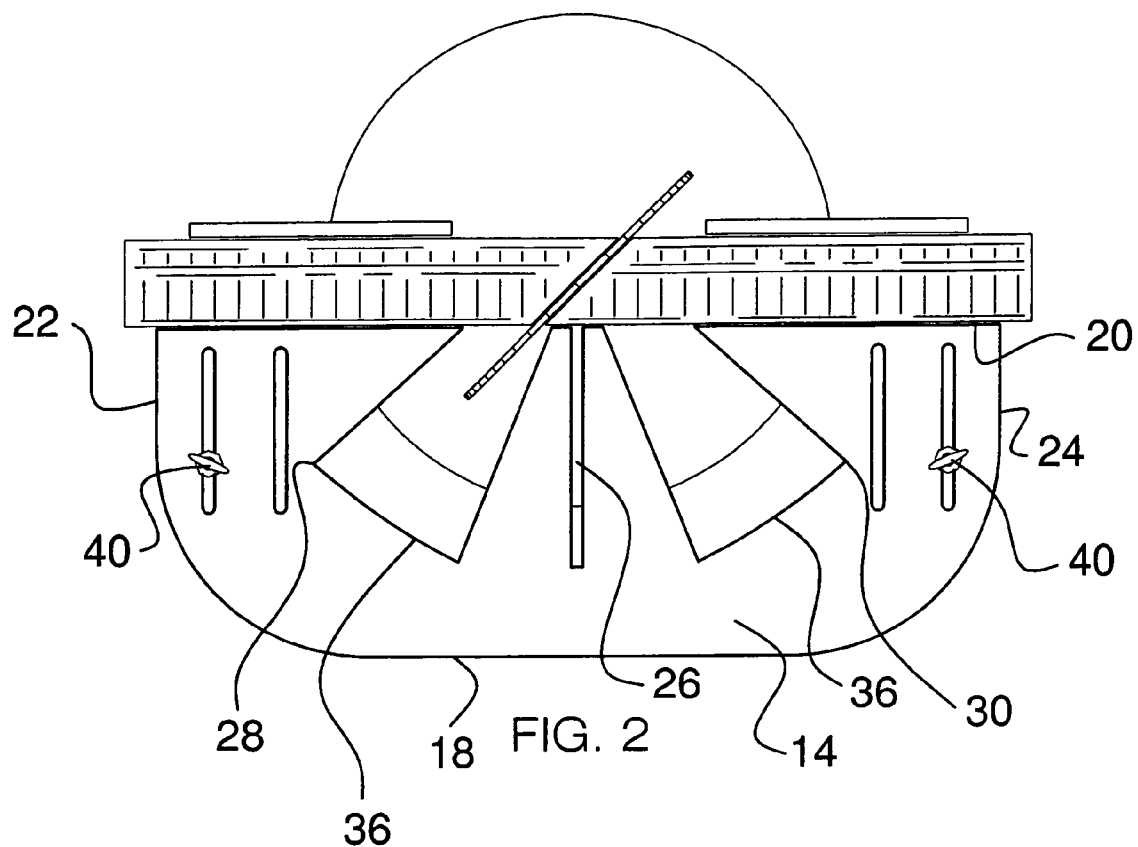
FIG. 2 is a top view of the present invention.
Figure 3:
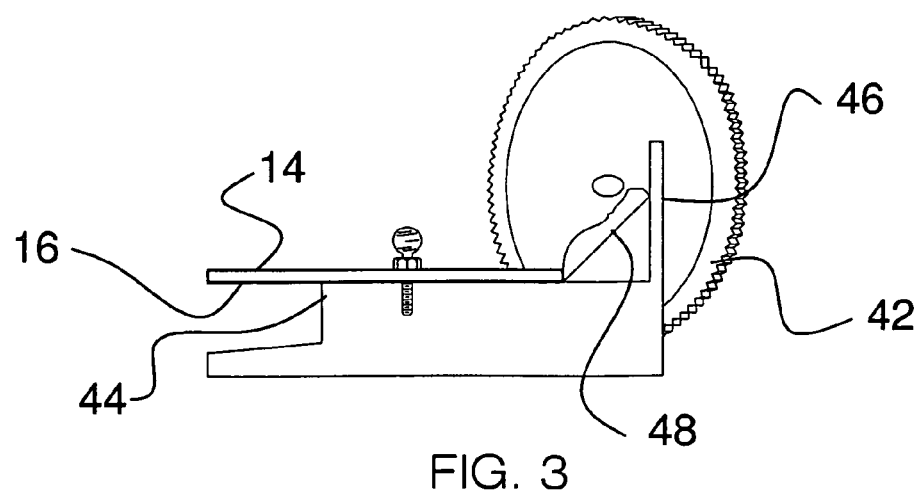
FIG. 3 is a side view of the present invention.

With reference now to the drawings, and in particular to FIGS. 1 through 3 thereof, a new cutting aid device embodying the principles and concepts of the present invention and generally designated by the reference numeral 10 will be described.

As best illustrated in FIGS. 1 through 3, the crown molding cutting aid apparatus 10 generally comprises a panel 12 that has a top side 14, a bottom side 16, a front edge 18, a back edge 20, a first side edge 22 and a second side edge 24. The panel 12 has a slot 26 therein that extends into the back edge 20 and toward the front edge 18. The slot 26 is equally spaced from the first 22 and second 24 side edges. The slot 26 has a width equal to about ¼ inch and extends at least 6 inches from the back edge 20.

The back edge 20 has a first notch 28 and a second notch 30 extending therein. The first 28 and second 30 notches are positioned on opposite sides of the slot 26. Each of the first 28 and second 30 notches has a first lateral edge 32, a second lateral edge 34 and a rear edge 36 positioned opposite of the back edge 20. Each of the first lateral edges 32 is positioned adjacent to the slot 26. The first lateral edges 32 are spaced from the slot 26 a distance between ½ inch and 2 inches. The second lateral edges 34 are spaced from the slot 26 a distance between 3 inches and 4 inches. The first 32 and second 34 lateral edges are each angled away from the slot 26. An angle of the first lateral edges 32 with respect to the back edge 20 has a measurement of between 20 degrees and 25 degrees. An angle of the second lateral edge 34 with respect to the back edge 20 has a measurement between 45 degrees and 50 degrees.

The panel 12 has a plurality of elongated apertures 38 extending therethrough. A longitudinal axis of each of the apertures 38 is perpendicularly orientated to the back edge 20. At least two of the apertures 38 are positioned between the first notch 28 and the first side edge 22. At least two of the apertures 38 are positioned between the second notch 30 and the second side edge 24. The back edge has a length generally between 20 inches and 28 inches. A distance from the back edge to the front edge is generally between 8 inches and 12 inches.

A plurality of fasteners 40 is provided. Each of the fasteners 40 is removably positionable through one of the apertures 38 and into a table 44 of a miter saw 42. The fasteners 40 are configured to releasably secure the panel to the table 44 and the slots 38 allow for selective adjustment of the panel 12 on the table 44.

In use, the panel 12 is secured to a miter saw table 44 so that the back edge 20 faces and is spaced from a back wall 46 of the table 44. A portion of crown molding 48 may be positioned on the table 44 and abutted against the back edge 20 so that the crown molding 48 is stabilized at a constant angle on the table 44 while it is being cut by the miter saw 42 as is shown in FIG. 3. The slot 26 and notches 28, 30 allow for the passage of a blade of the miter saw 42 through the panel 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A miter saw table accessory device for supporting a portion of crown molding at a constant relative angle while being cut with a miter saw, said accessory device comprising:
   a panel construction having a top side, a bottom side adapted for operative contact with the top surface of a miter saw table, a front edge, and straight back edge adapted for contact with one edge of a section of crown molding, while said crown molding is angled upwardly against a back wall of the miter saw table, a first side edge and a second side edge,
   a central slot extending inwardly at a right angle from the straight back edge of said panel and toward said front edge, and being equally spaced from said first and second side edges, and adapted for receiving a miter saw blade upon making a straight cut in said molding,
   a first notch and a second notch extending inwardly from the straight back edge of said panel on opposite sides of said central slot, each of said first and second notches having a first lateral edge, a second lateral edge, and a rear edge joining between the inner ends of said first and second lateral edges, said first and second lateral edges each being angled away from the central slot proceeding from the back edge to the front edge as well as away from each other from the back edge of the panel, said first and second notches being dimensioned to receive said miter saw blade when making an angled cut in said molding,
   a plurality of apertures elongated in a direction between the front and back edge, extending through said panel, and
   a plurality of fasteners each being removably positionable through one of said apertures and into a table of a miter saw for releasably securing said panel to said table,
   said table in one of a plurality of positions away from the back wall of the miter saw table, wherein said panel is adapted to be secured to the table of a miter saw in one of the plurality of positions such that its back edge faces and is spaced from a vertical guide wall of said table such that portions of crown molding of various sizes may be positioned on the table with one side edge abutted against the back edge of the panel and the other side edge supported at an angle against the vertical guide wall such that the crown molding is stabilized on the table while being cut by the miter saw.

2. The device according to claim 1, wherein said slot has a width equal to about ½ inch, said slot extending inwardly at least 6 inches from said straight back edge.

3. The device according to claim 1, wherein said first lateral edges are spaced from said slot a distance between ½ inch and 2 inches, and said second lateral edges are spaced from said slot a distance between 3 inches and 4 inches.

4. The device according to claim 3, wherein the angle of said first lateral edges is between 20 degrees and 25 degrees with respect to said back edge, and the angle of said second lateral edges is between 45 degrees and 50 degrees with respect to said back edge.

5. The device according to claim 1, wherein each of said plurality of apertures is elongated along a line that intersects said straight back edge, at least two of said plurality of apertures being positioned between said first notch and said first side edge, and at least two of said plurality of apertures being positioned between said second notch and said second side edge.

6. The device according to claim 1, wherein said straight back edge has a length generally between 20 inches and 28 inches, and the distance from said back edge to said front edge being generally between 8 inches and 12 inches.

7. A device for supporting a portion of crown molding at a constant relative angle upon the table of a miter saw while being cut with a miter saw, said device comprising:
   a panel having a top side, a bottom side adapted for full contact with the table of a miter saw, a front edge, a back edge, a first side edge and a second side edge, said top side being substantially planar, said panel having a slot therein, said slot extending into said back edge and toward said front edge, said slot being equally spaced from said first and second side edges, said slot having a width equal to about ¼ inch and extending at least 6 inches from said back edge, said slot adapted for receiving a miter saw blade upon making a straight cut in said molding, said back edge having a first notch and a second notch extending therein, said first and second notches being positioned on opposite sides of said slot, each of said first and second notches having a first lateral edge, a second lateral edge and a rear edge positioned opposite said back edge, each of said first lateral edges being positioned adjacent to said slot, said first lateral edges being spaced from said slot a distance between ½ inch and 2 inches, said second lateral edges being spaced from said slot a distance between 3 inches and 4 inches, said first and second lateral edges each being angled away from said slot proceeding from said back edge to said front edge with said first lateral edges angled at a measurement of between 20 degrees and 25 degrees, and said second lateral edges angled with respect to said back edge between 45 and 50 degrees, said first and second notches being dimensioned to receive said miter saw blade when making an angled cut in said molding, said panel having a plurality of apertures elongated in a direction between the front and back edge and extending therethrough, said apertures extending into said top side and outwardly of said bottom side, each of said apertures being elongated along a line that intersects said back edge, at least two of said plurality of apertures being positioned between said first notch and said first side edge, at least two of said plurality of apertures being positioned between said second notch and said second side edge, said back edge having a length generally between 20 inches and 28 inches, a distance from said back edge to said front edge being generally between 8 inches and 12 inches each of said slot, said first notch and said second notch extending through each of said top and bottom sides;
   a plurality of fasteners, each of said fasteners being removably positionable through one of said apertures and into a table of a miter saw and configured to releasably secure said panel to said table in one of a plurality of positions away from a back wall of the miter saw table; and
   wherein said panel is secured to the table such that said back edge faces and is spaced from the back wall of said table in one of the plurality of positions, wherein portions of crown molding of various sizes may be positioned on the table and abutted against the back edge such that the crown molding is stabilized on the table at an angle between said back edge and a guide attached to the saw table while being cut by the miter saw.

8. A miter saw table accessory to facilitate holding a section of crown molding on a miter saw table while making a miter cut in said molding to match an out of square ceiling corner comprising:

a panel having a top side, a bottom side, a front edge, a back edge, a first side edge and a second side edge, said panel having a centrally located slot therein extending inwardly from said back edge at a right angle toward said front edge and adapted for receiving said miter saw blade upon making a straight cut in said molding, first and second notches in said panel extending inwardly from said back edge, said first and second notches being positioned on opposite sides of said slot and each having a first lateral edge, a second lateral edge and a rear edge positioned opposite of said back edge, said first and second lateral edges each being angled away from said slot and said first and second notches being dimensioned to receive said miter saw blade when making an angled cut in said molding within a range of angles equal to the distance between the first and second lateral edges, a plurality of through-apertures in said panel elongated in a direction between the front and back edge, the bottom side of the table accessory being adapted for full contact with a miter saw table while the back of such accessory is adapted to contact and support at a desired angle a section of crown molding while said crown molding is supported at an angle against a back wall of the miter saw table, and a plurality of fasteners for passing through one of said apertures and for releasably securing said panel to said miter saw table in one of a plurality of positions away from the back wall of the miter saw table, wherein during use said panel is secured to the said miter saw table such that its back edge faces and is spaced from the back wall of said table a sufficient distance in one of the plurality of positions, so that a portion of crown molding may be positioned on the table and abutted against the back edge and back wall such that the crown molding is stabilized on the table while being cut by the miter saw.

9. The miter saw table accessory according to claim 8, wherein said slot has a width equal to about ¼ inch and extends at least 6 inches from said back edge.

10. The miter saw table accessory according to claim 8, wherein the first lateral edges of said notches are spaced a distance between ½ inch and 2 inches from said slot, and the second lateral edges are spaced a distance between 3 inches and 4 inches from said slot.

11. The miter saw table accessory according to claim 10, wherein the angle of said first lateral edges with respect to said back edge is between 20 degrees and 25 degrees, and the angle of said second lateral edges with respect to said back edge is between 45 degrees and 50 degrees.

12. The miter saw table accessory according to claim 8, wherein each of said plurality of apertures is elongated along a line that intersects said back edge, with at least two of said plurality of apertures being positioned between said first notch and said first side edge, at least two of said plurality of apertures being positioned between said second notch and said second side edge.

13. The miter saw table accessory according to claim 8, wherein said back edge is straight and has a length generally between 20 inches and 28 inches, and wherein distance from said back edge to said front edge is generally between 8 inches and 12 inches.

14. The miter saw table accessory of claim 8 in which the width of the rear edge of said first and second notches is greater that the width of said notches at said back edge.

* * * * *